United States Patent
Yang et al.

(10) Patent No.: US 10,047,871 B2
(45) Date of Patent: Aug. 14, 2018

(54) VALVE DEVICE CAPABLE OF MAINTAINING SAFE PRESSURE OF PRESSURE VESSEL

(71) Applicant: PURICOM WATER INDUSTRIAL CORPORATION, Taichung (TW)

(72) Inventors: Chung-Hsiang Yang, Taichung (TW); Ching-Yi Wu, Taichung (TW)

(73) Assignee: PURICOM WATER INDUSTRIAL CORPORATION, Taichung (TW)

( * ) Notice: Subject to any disclaimer, the term of this patent is extended or adjusted under 35 U.S.C. 154(b) by 88 days.

(21) Appl. No.: 15/201,378

(22) Filed: Jul. 1, 2016

(65) Prior Publication Data

US 2017/0002942 A1    Jan. 5, 2017

(30) Foreign Application Priority Data

Jul. 2, 2015    (TW) .............................. 104210716 U

(51) Int. Cl.
| | | |
|---|---|---|
| *F16K 15/18* | (2006.01) | |
| *F16K 17/30* | (2006.01) | |
| *F16K 5/04* | (2006.01) | |

(52) U.S. Cl.
CPC .......... *F16K 15/188* (2013.01); *F16K 5/0407* (2013.01); *F16K 5/0414* (2013.01); *F16K 17/30* (2013.01); *Y10T 137/8803* (2015.04)

(58) Field of Classification Search
CPC .... F16K 5/0407; F16K 5/0414; F16K 15/188; F16K 17/30; Y10T 137/88022; Y10T 137/8803; Y10T 137/88038

USPC .......................... 137/614.16, 614.17, 614.18
See application file for complete search history.

(56) References Cited

U.S. PATENT DOCUMENTS

| 65,511 | A | * | 6/1867 | Sanders | ................. F16K 5/0414 |
| | | | | | 251/310 |
| 2,217,330 | A | * | 10/1940 | Buttner | .................... F16K 17/30 |
| | | | | | 137/364 |
| 2,668,555 | A | * | 2/1954 | Bartolat | .................. F16K 17/30 |
| | | | | | 137/498 |
| 4,742,851 | A | * | 5/1988 | Lundblade | ............. B67D 3/045 |
| | | | | | 137/614.12 |
| 5,373,868 | A | * | 12/1994 | Rodriguez | ............ F16K 5/0605 |
| | | | | | 137/543 |
| 5,462,081 | A | * | 10/1995 | Perusek | .................. F16K 17/30 |
| | | | | | 137/498 |

(Continued)

*Primary Examiner* — Eric Keasel
*Assistant Examiner* — Richard K Durden
(74) *Attorney, Agent, or Firm* — Cheng-Ju Chiang

(57) ABSTRACT

A valve device comprises a body, a rotating valve set and a safety valve set. The body comprises an inner space, a first opening and a second opening. When the rotating valve set is located in a water-providing position, the inner space, the first opening and the second opening are communicable. When water pressure is higher than a safe pressure, the safety valve set and the rotating valve set can block the first opening and the second opening that safe pressure is maintained at the second opening. When water pressure becomes normal, the safety valve set is moved to its original position. Therefore, it has a piston-typed safety valve set is highly reliable. It has a coaxial structure to reduce its volume. It has an engaging and hooking structure for precise and easy assembly. It has an opening and/or closing function for its valve body with wide range of applications.

6 Claims, 13 Drawing Sheets

(56) References Cited

U.S. PATENT DOCUMENTS

2011/0303660 A1\* 12/2011 Yang ..................... B01D 61/10
                                                    220/23.83

\* cited by examiner

VALVE DEVICE CAPABLE OF MAINTAINING SAFE PRESSURE OF PRESSURE VESSEL

BACKGROUND OF THE INVENTION

1. Field of the Invention

The present invention relates to a valve device capable of maintaining safe pressure of a pressure vessel, particularly with regard to a valve device capable of maintaining safe pressure of a pressure vessel having a piston-typed safety valve set with high reliability, a coaxial structure of the valve device capable of reducing its volume, an engaging and hooking structure of the valve device contributing to precise and easy assembly of the valve device, having an opening and closing function for its valve body and having a wide range of practical applications.

2. The Related Arts

After cleaned water and wastewater are produced from traditional reverse osmosis water filter devices, wastewater is usually drained and cleaned water is conducted to flow through a three-way joint to be temporarily stored in a pressure vessel. When users are about take water, cleaned water from the pressure vessel is conducted to flow out to water outlets for users to take.

However, due to malfunction or some special reasons, the traditional reverse osmosis water filter devices cannot be stopped. Under such circumstances, it will cause excess pressure for the cleaned water. Also, because the pressure vessel has no any protective mechanism, the pressure vessel will be damaged or start to leak water.

Secondly, it is also very difficult to dismantle the pressure vessel when maintenance thereof is required. Not only water in entire pipelines needs to be removed, but also pressure of the pressure vessel needs to be released. The whole procedure is very complicated and troublesome.

In addition, if traditional ball valves are installed at a water inlet of the pressure vessel, it can only be manually switched to open or close, and cannot automatically determine whether the pressure of the pressure vessel is too large or not. If traditional diaphragm-typed pressure-releasing valves or protective valves are installed at the water inlet of the pressure vessel, their reliability is relatively low.

In view of the above, it is necessary to research and develop new technology to solve the above-mentioned disadvantages.

SUMMARY OF THE INVENTION

The main objective of the present invention is to provide a valve device capable of maintaining safe pressure of a pressure vessel having a piston-typed safety valve set with high reliability, a coaxial structure of the valve device capable of reducing its volume, an engaging and hooking structure of the valve device contributing to precise and easy assembly of the valve device, and having an opening and closing function for its valve body and having a wide range of practical applications In particular, problems to be solved by the present invention as mentioned above includes the reliability of the traditional diaphragm-typed protective valves may be reduced due to long-time use, and it further causes issues like application materials of the pressure vessel being limited in response to hydraulic pressure changing.

The technical means to solve the above problems is to provide a valve device capable of maintaining safe pressure of a pressure vessel comprising a valve device capable of maintaining safe pressure of a pressure vessel. The valve device comprises a body comprising an inner space, a first opening spatially communicable with the inner space and having a first inner wall surface and a longitudinal axis defined to extend through a center of the first opening, a second opening spatially communicable with the inner space and the first opening and intersecting the first opening.

The valve device capable of maintaining safe pressure of a pressure vessel in accordance with the present invention further comprises a rotating valve set disposed at the body corresponding to the first opening. The rotating valve set comprises a rotating part being inserted in the body and is coaxial with the first opening along the longitudinal axis. The rotating part extends into the inner space and rotates along the longitudinal axis in the inner space relative to the body between a water-providing position and a water-stopping position. A pivot connecting part is located at the rotating part and is coaxial with the first opening along the longitudinal axis. A water hole is disposed at a radial position of the rotating valve set and extends radially through the rotating valve set corresponding to the second opening. The water hole and the second opening are spatially communicable with each other when the rotating part rotates to the water-providing position. The water hole and the second opening are mutually staggered away from each other when the rotating part rotates to the water-stopping position. A hole wall is located between the first opening and the second opening in the body, and is coaxial with the first opening along the longitudinal axis.

The valve device capable of maintaining safe pressure of a pressure vessel of the present invention further comprises a safety valve set being disposed in the rotating part to extend through the rotating part and extend into the inner space. The safety valve set comprises a valve part being disposed inside the rotating part and being able to move along the longitudinal axis relative to the rotating part. The valve part has a compression end edge and a stopper end edge. The compression end edge faces toward the hole wall, and the stopper end edge oppositely faces toward the pivot connecting part. A valve claw end part of the safety valve set extends from the compression end edge along a direction toward the first inner wall surface in order to abut against the first inner wall surface for the valve part, and is able to maintain spatial communication between the first opening and the inner space. A connecting rod part of the safety valve set is disposed between the compression end edge and the valve claw end part, and forms a watercourse between the compression end edge and the valve claw end part. The watercourse is located inside the inner space and is spatially communicable with the first opening and the second opening. A pivoting end part of the safety valve set extends from the stopper end edge along a direction from the stopper end edge toward the pivot connecting part, and is used for the valve part to be inserted and disposed in the pivot connecting part and to be able to move relative to the pivot connecting part. A flexible piece of the safety valve set is sleeved and disposed on the pivoting end part, and is engaged between the rotating part and the stopper end edge. The flexible piece is used for engaging and pushing the valve part to make the valve claw end part abutting and engaging on the first inner wall surface. A sealable section part of the safety valve set is disposed adjacent to the valve claw end part corresponding to the hole wall.

According to the above mentioned design of the present invention, the second opening is opened or closed when the rotating part is located at the water-providing position or the water-stopping position, respectively. When the rotating part is located at the water-providing position, water is supplied from the first opening toward the second opening. When the hydraulic pressure is increased, the compression end edge is pushed to press the flexible piece. When the hydraulic pressure is increased to exceed a preset safe pressure, the sealable section part is engaged with the hole wall to block a passageway between the first opening and the second opening so that a safe pressure can be maintained at the second opening.

The above objectives and advantages of the present invention are easy to get better understanding from the following detailed description and accompanying drawings of selected embodiments.

The present invention is further demonstrated in detail referring to the following detailed description and accompanying drawings.

DETAILED DESCRIPTION OF PREFERRED EMBODIMENT

Figure 1A:
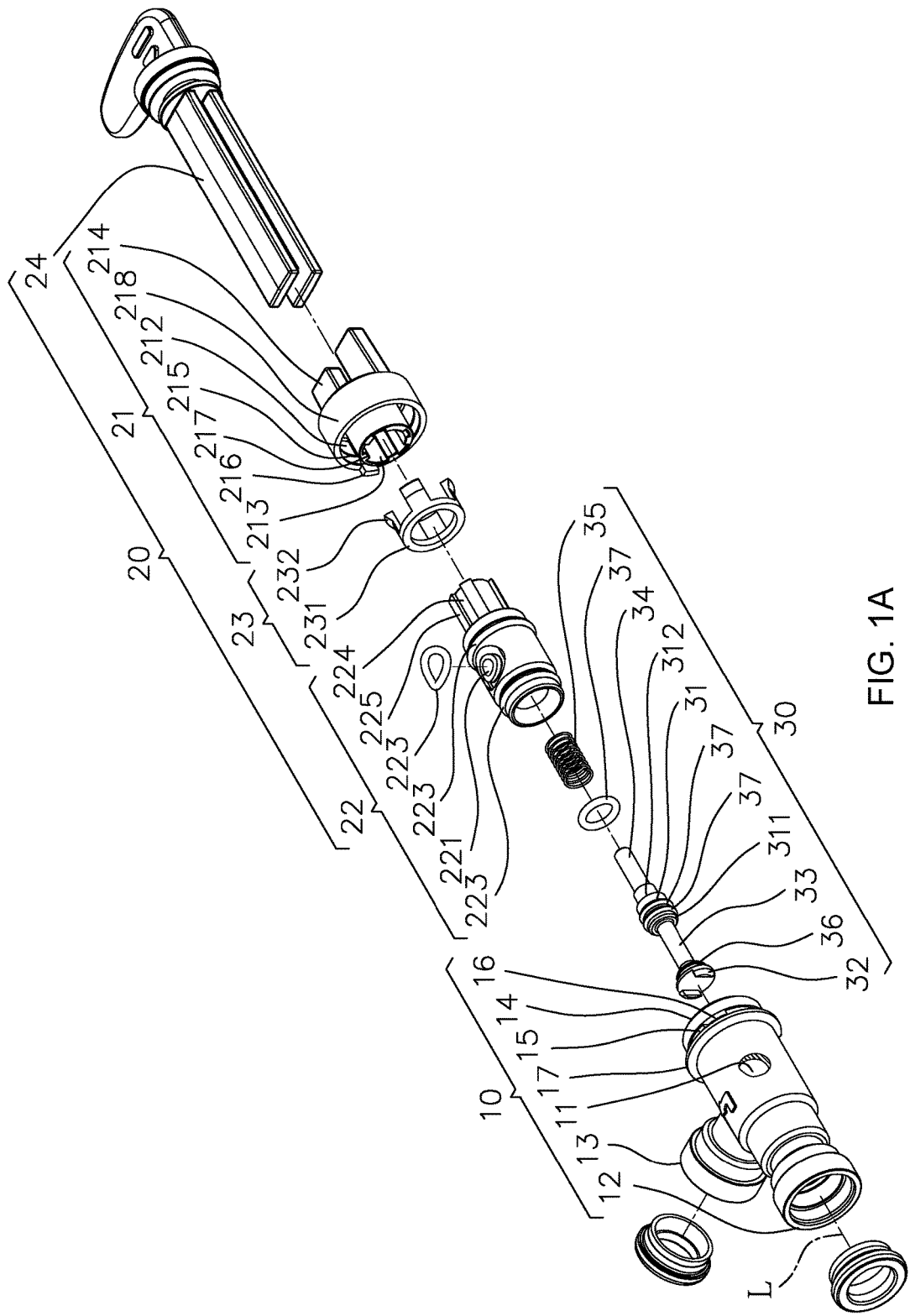
FIG. 1A shows a schematic diagram of an exploded perspective view of a valve device capable of maintaining safe pressure of a pressure vessel in accordance with the present invention.
Figure 1B:
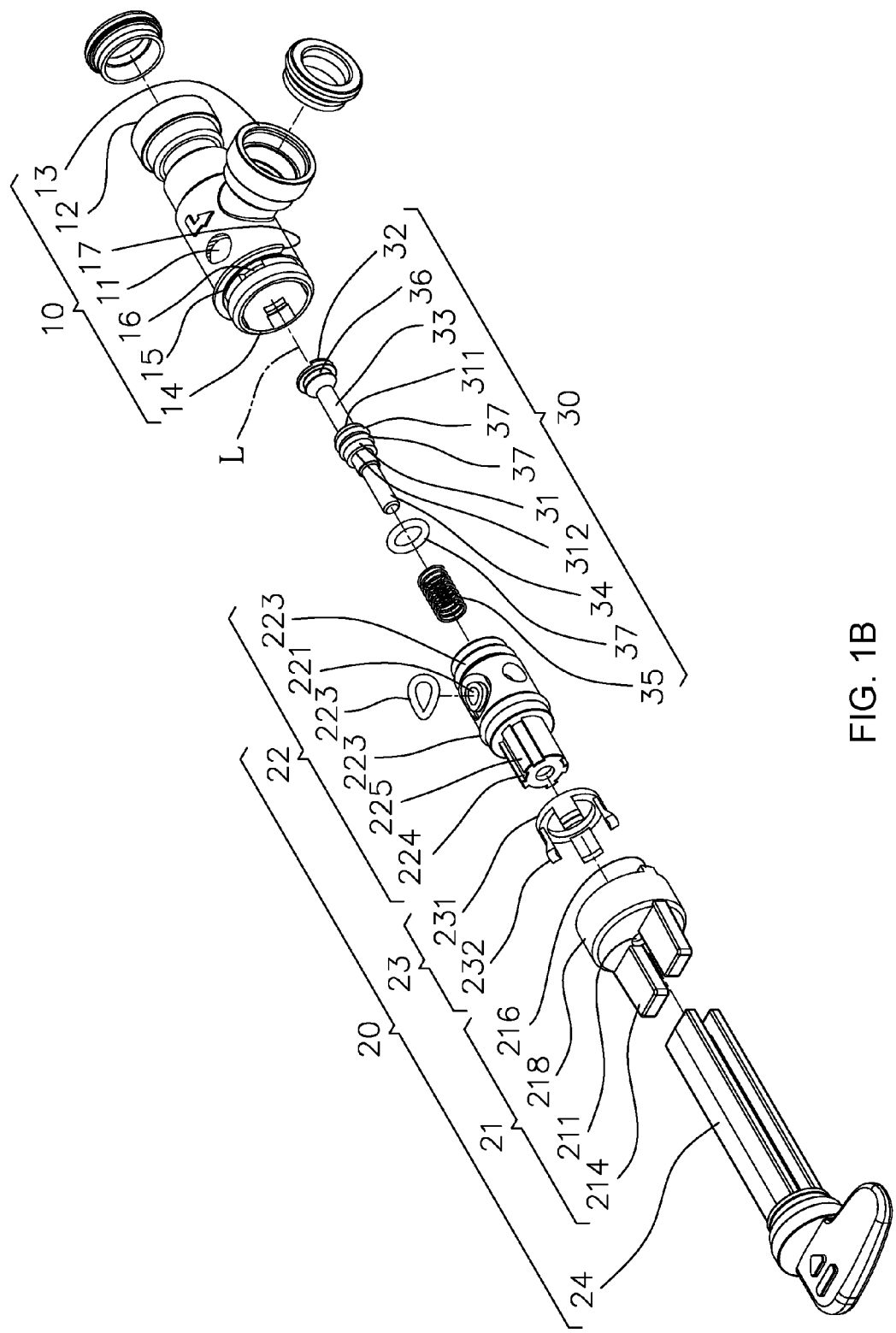
FIG. 1B shows a schematic diagram of an exploded perspective view of the valve device capable of maintaining safe pressure of a pressure vessel viewed from another viewing angle different from FIG. 1A in accordance with the present invention.
Figure 1C:
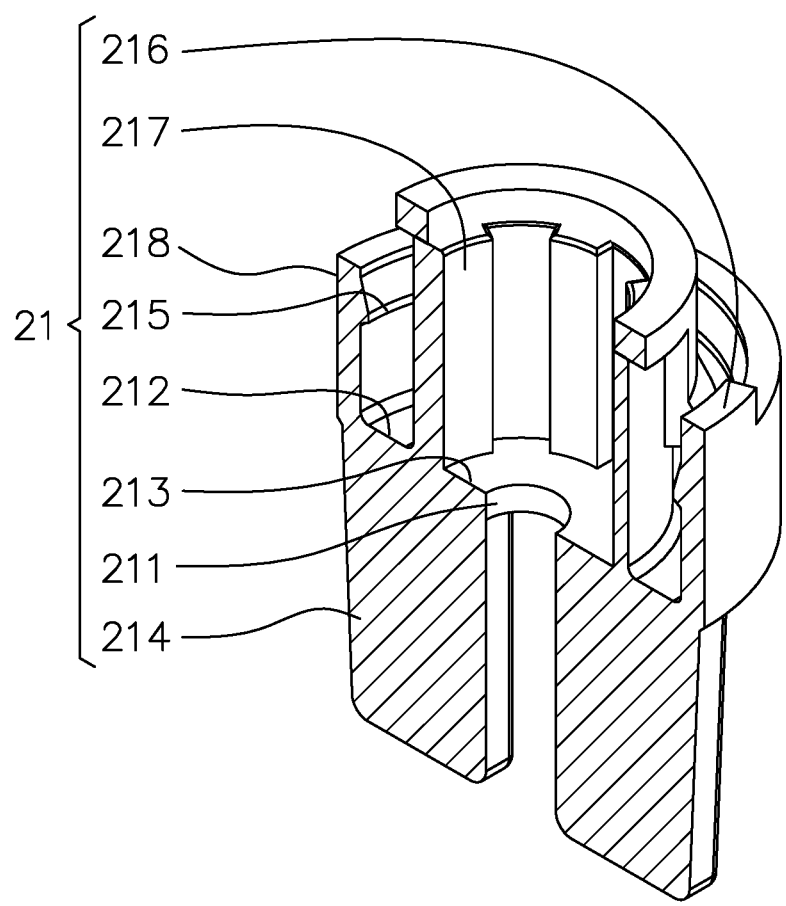
FIG. 1C shows a schematic diagram of a sectional perspective view of a rotating part in accordance with the present invention.
Figure 2A:
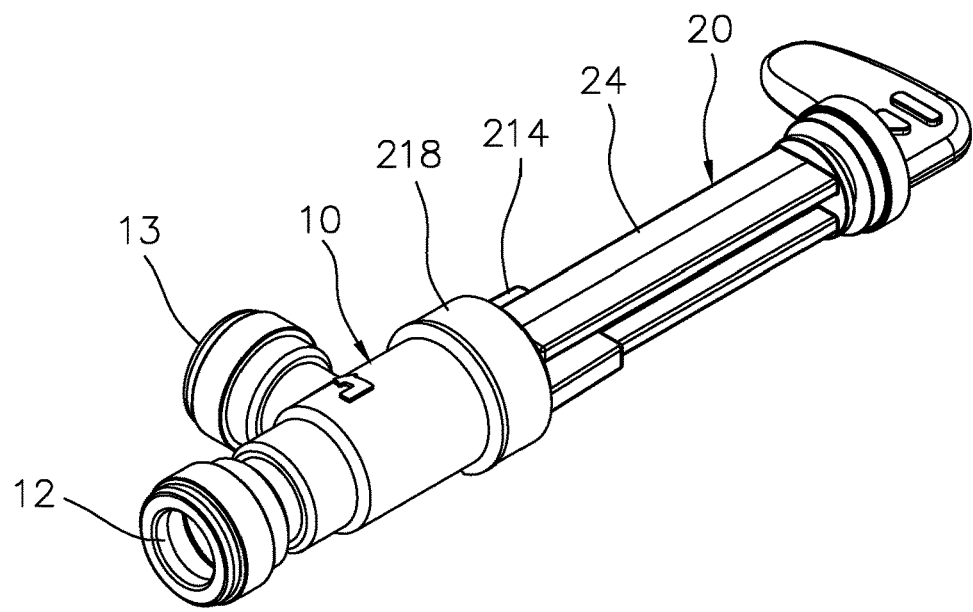
FIG. 2A shows a schematic diagram of an assembled perspective view of FIG. 1A in accordance with the present invention.
Figure 2B:
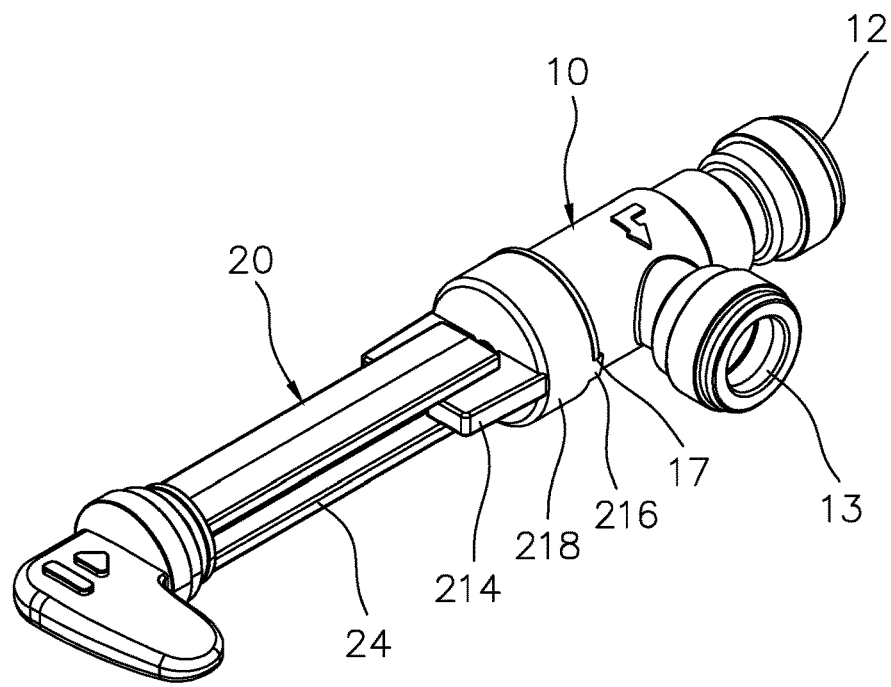
FIG. 2B shows a schematic diagram of an assembled perspective view of FIG. 1A viewed from another viewing angle different from FIG. 2A in accordance with the present invention.

Referring to FIGS. 1A, 1B, 1C, 2A, 2B and 3, a valve device capable of maintaining safe pressure of a pressure vessel in accordance with the present invention mainly comprises a body 10, a rotating valve set 20, and a safety valve set 30.

About the body 10, it includes an inner space 11, a first opening 12, and a second opening 13. The first opening 12 is spatially communicable with the inner space 11 and having a first inner wall surface 121 and a longitudinal axis L defined to extend through a center of the first opening 12. The second opening 13 is spatially communicable with the inner space 11 and the first opening 12.

Figure 9:
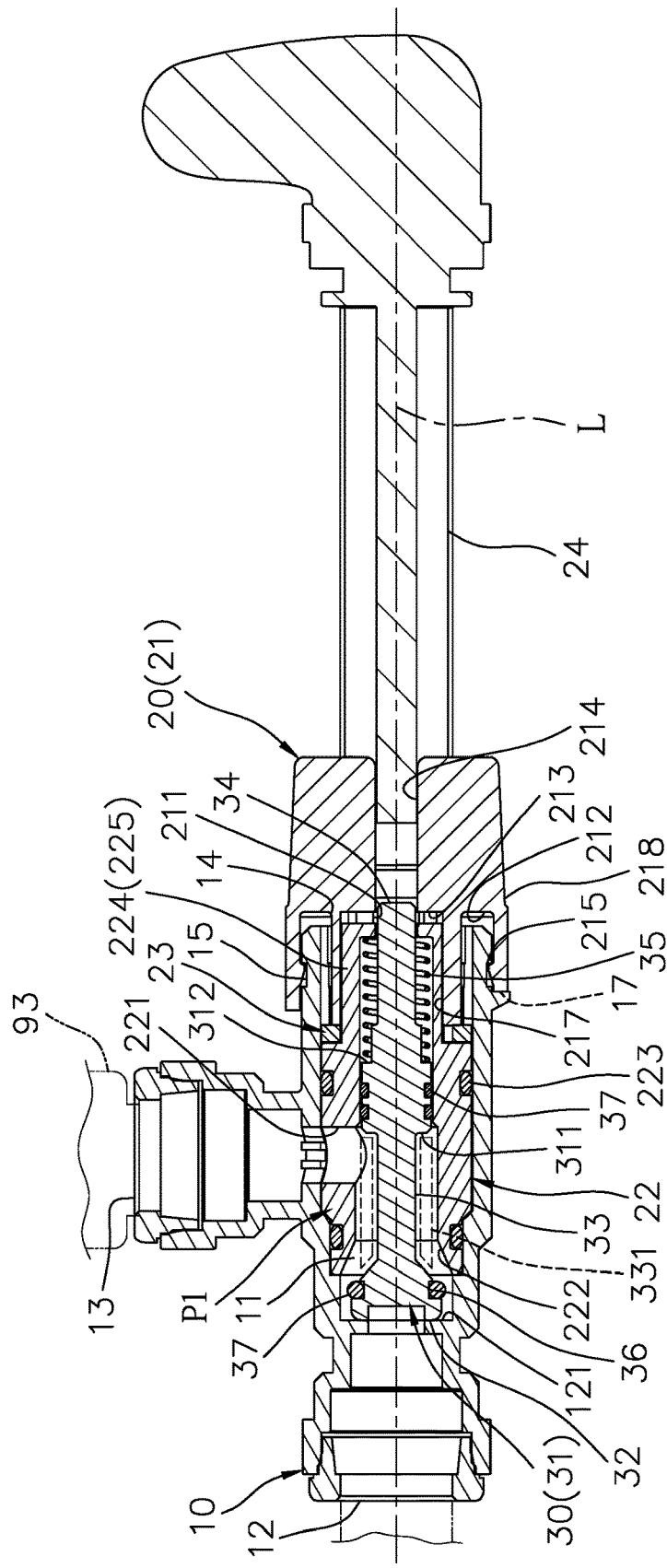
FIG. 9 shows a schematic diagram of a sectional view of the valve device in accordance with the present invention showing the rotating part is located in a water-providing position thereof.
Figure 10:
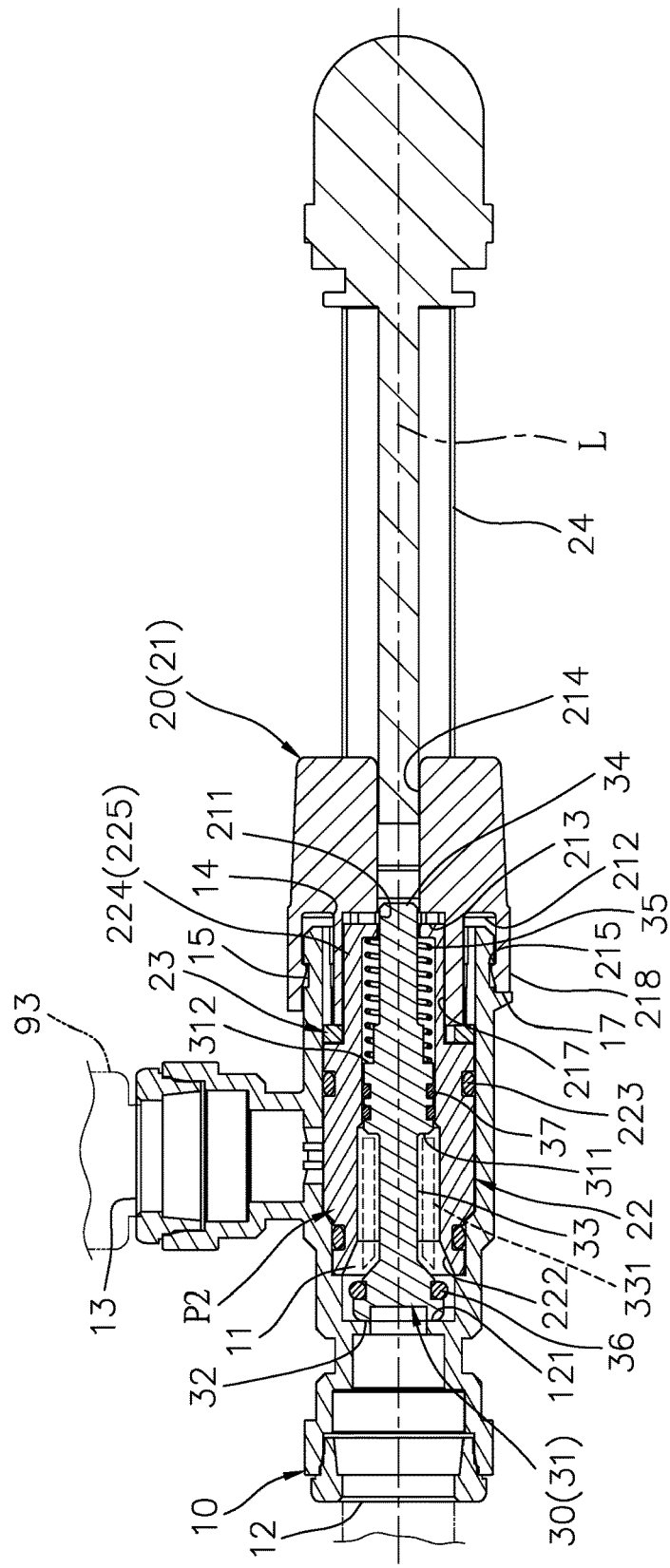
FIG. 10 shows a schematic diagram of a sectional view of the valve device in accordance with the present invention showing the rotating part is located in the water-stopping position of the rotating part.

Concerning the rotating valve set 20, it is disposed at the body 10 corresponding to the first opening 12. The rotating valve set 20 comprises a rotating part 21 being disposed and inserted in the body 10 and is coaxial with the first opening 12 along the longitudinal axis L. The rotating part 21 extends into the inner space 11 and rotates along the longitudinal axis L in the inner space 11 relative to the body 10 between a water-providing position P1 (as shown in FIG. 9) thereof and a water-stopping position P2 (as shown in FIG. 10) thereof. A pivot connecting part 211 is located at the rotating part 21 and is coaxial with the first opening 12 along the longitudinal axis L. A water hole 221 is disposed at a radial position of the rotating valve set 20 and extends radially through the rotating valve set 20 corresponding to the second opening 13. The water hole 221 and the second opening 13 are spatially communicable with each other when the rotating part 21 rotates to the water-providing position P1. The water hole 221 and the second opening 13 are mutually staggered away from each other when the rotating part 21 rotates to the water-stopping position P2. A hole wall 222 is located between the first opening 12 and the second opening 13 in the body 10, and is coaxial with the first opening 12 along the longitudinal axis L.

Regarding the safety valve set 30, it is disposed in the rotating part 21 to extend through the rotating part 21 and extend into the inner space 11. The safety valve set 30 includes a valve part 31, a valve claw end part 32, a connecting rod part 33, a pivoting end part 34, a flexible piece 35, and a sealable section part 36.

The valve part 31 is disposed inside the rotating part 21 and being able to move along the longitudinal axis L relative to the rotating part 21. The valve part 31 has a compression end edge 311 and a stopper end edge 312. The compression end edge 311 faces toward the hole wall 222, and the stopper end edge 312 oppositely faces toward the pivot connecting part 211.

The valve claw end part 32 extends out from the compression end edge 311 along a direction toward the first inner wall surface 121 for the valve part 31 to abut against the first inner wall surface 121, and is able to maintain spatial communication between the first opening 12 and the inner space 11.

The connecting rod part 33 is disposed between the compression end edge 311 and the valve claw end part 32, and forms a watercourse 331 between the compression end edge 311 and the valve claw end part 32. The watercourse 331 is located inside the inner space 11 and is spatially communicable with the first opening 12 and the second opening 13.

The pivoting end part 34 extends out from the stopper end edge 312 along a direction from the stopper end edge 312 toward the pivot connecting part 211, and is used for the valve part 31 to be inserted and disposed in the pivot connecting part 211 and to be able to move relative to the pivot connecting part 211.

The flexible piece 35 is sleeved and disposed on the pivoting end part 34, and is engaged between the rotating part 21 and the stopper end edge 312. The flexible piece 35 is used for engaging and pushing the valve part 31 to make the valve claw end part 32 abutting and engaging on the first inner wall surface 121.

The sealable section part 36 is disposed adjacent to the valve claw end part 32 corresponding to the hole wall 222.

According to the above mentioned design of the present invention, the second opening 13 is opened or closed when the rotating part 21 is located at the water-providing position P1 or the water-stopping position P2, respectively. When the rotating part 21 is located at the water-providing position P1, water is supplied from the first opening 12 toward the second opening 13. When the hydraulic pressure is increased, the compression end edge 311 is pushed to press the flexible piece 35. When the hydraulic pressure is increased to exceed a preset safe pressure, the sealable section part 36 is engaged with the hole wall 222 to block a passageway between the first opening 12 and the second opening 13 so that a safe pressure can be maintained at the second opening 13.

In practice, in a preferred embodiment of the present invention, the first opening 12 and the second opening 13 are set to intersect each other vertically.

The body 10 further has a valve opening 14, a rotating groove 15 and at least one limiting recess part 16. The rotating groove 15 is ring-shaped, and is recessed and disposed outside the body 10 adjacent to the valve opening 14. The limiting recess part 16 penetrates through the rotating groove 15.

The rotating valve set 20 is disposed in the valve opening 14. The rotating valve set 20 comprises the rotating part 21, a rotating valve part 22, a limiting part 23, and an auxiliary rotating handle 24.

The rotating part 21 further comprises an outer circular groove 212, an inner circular groove 213, a connecting piece 214, a bulge circular wall 215, an auxiliary rotating projecting piece 216, several circular groove ribs 217, and a rotating contact surface 218.

The outer circular groove 212 is coaxial with the first opening 12 along the longitudinal axis L. The inner circular groove 213 of the rotating part 21 is disposed to be coaxial with the outer circular groove 212. The pivot connecting part 211 is penetrated through the rotating part 21 and is disposed at an axial position of the inner circular groove 213. The connecting piece 214 extends away from the rotating part 21 opposite to an opening direction of the outer circular groove 212. The bulge circular wall 215 is located at an inner groove surface of the outer circular groove 212 corresponding to the rotating groove 15. The bulge circular wall 215 is used for the rotating part 21 to engage into the rotating groove 15 and is able to rotate relative to the body 10. The auxiliary rotating projecting piece 216 extends outwardly from a side wall of the outer circular groove 212. Furthermore, the circular groove ribs 217 extend along the longitudinal axis L in the inner circular groove 213, and are disposed at a side wall of the inner circular groove 213 with a predetermined interval along a circumferential direction of the inner circular groove 213. The rotating contact surface 218 is located at an outer surface of the side wall of the outer circular groove 212, and is used for engaging in order to rotate the rotating valve set 20.

About the rotating valve part 22, it may further include at least one sealable ring body 223, a passive piece 224, and several of passive ribs 225.

The water hole 221 is corresponding to the second opening 13. The water hole 221 is disposed at a radial position of the rotating valve part 22 and extends radially through the rotating valve part 22. The hole wall 222 is located adjacent to an end of the rotating valve part 22 and between the first opening 12 and the second opening 13, and is coaxial with the first opening 12 along the longitudinal axis L. At least one sealable ring body 223 is sleeved and disposed at the rotating valve part 22. The passive piece 224 is disposed at the rotating valve part 22 corresponding to the inner circular groove 213, and is used for the rotating valve part 22 to be disposed and assembled in the inner circular groove 213. Moreover, the passive ribs 225 are disposed and distributed along a circumferential direction of the passive piece 224 corresponding to the plurality of circular groove ribs 217 for engagement and assembly of the rotating valve part 22 onto the plurality of circular groove ribs 217.

The rotating valve set 20 may further comprise a limiting part 23 having a ring body 231 and at least one limiting claw 232. The ring body 231 is used for limiting part 23 to be sleeved and disposed outside the plurality of passive ribs 225. The at least one limiting claw 232 is used for the limiting part 23 to engage with the limiting recess part 16 by being inserted from the inner space 11 toward the limiting recess part 16 in order to stop the rotating valve part 22 from dropping out of the valve opening 14 along the longitudinal axis L.

In addition, the rotating valve set 20 may further comprise an auxiliary rotating handle 24 connected to the connector piece 214 and used for auxiliary rotating the rotating part 21.

Besides, the safety valve set 30 further comprises at least one sealing ring body 37 sleeved and disposed at the valve part 31 for the valve part 31 being watertightly disposed inside the rotating part 21.

The present invention is mainly used in reverse osmosis water supply systems. The first opening 12 is in a parallel connection with a water source 91 and a drinking water faucet 92 at the same time in order that water can flow in the systems and/or flow out. The second opening 13 is spatially communicated with a reservoir pressure vessel 93 (Such vessel 93 is a well-known pressure vessel used for the reverse osmosis water supply systems, and therefore no more repeated description is required herein). The water source 91 supplies water to the reservoir pressure vessel 93 (Reverse osmosis is applied on water before supplying) when the water flows into the systems. The reservoir pressure vessel 93 supplies water to the drinking water faucet 92 for using (drinking) when the water flows out.

The reservoir pressure vessel 93 needs to limit supply of water with hydraulic pressure being less than 150 psi to the second opening 13.

Figure 3:
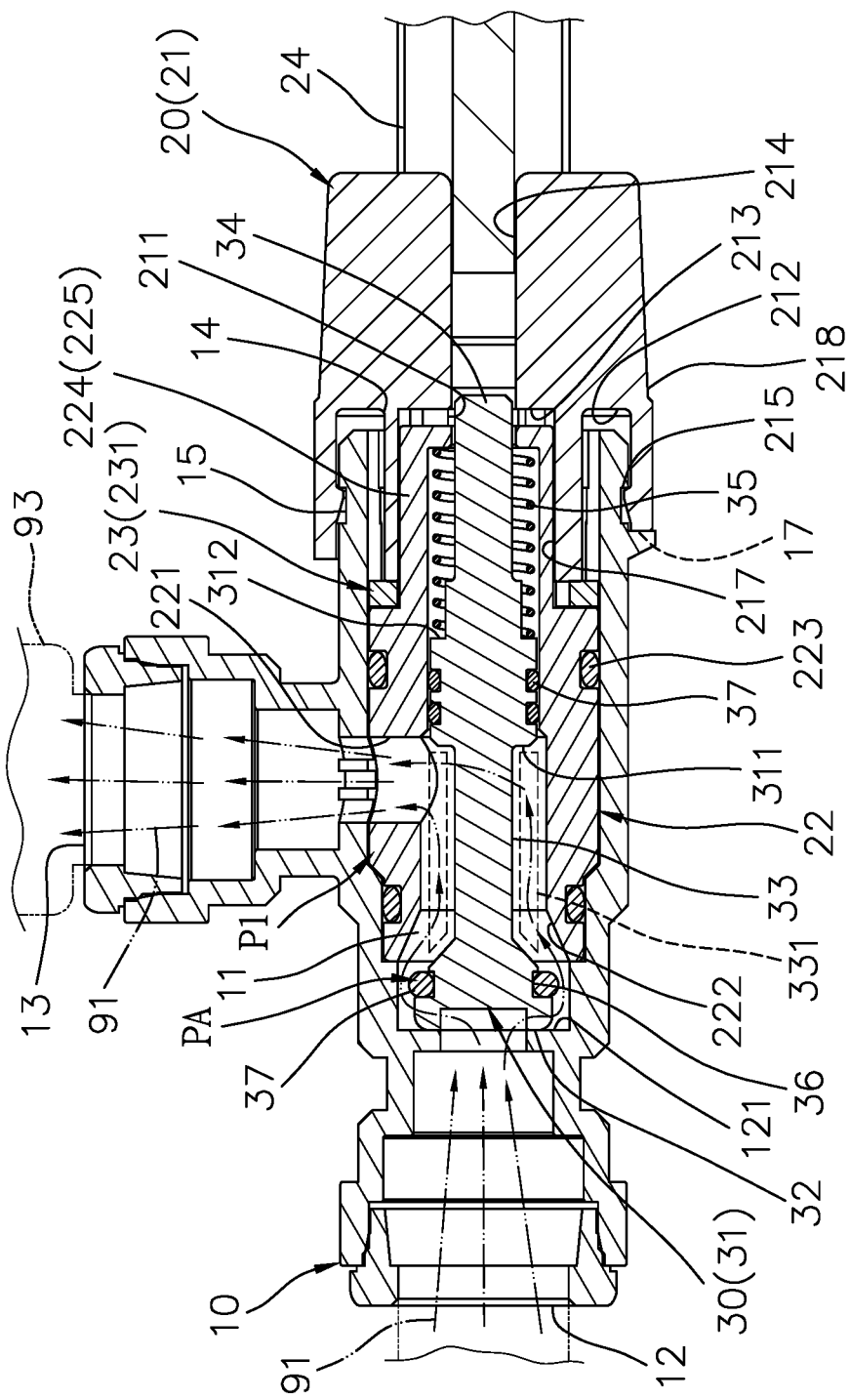
FIGS. 3 to 5 respectively show schematic diagrams of partially sectional views of the valve device in accordance with the present invention showing a sealable section part being located in an original position (storing water), an in-protecting position and a watertight position (safety protection) of the sealable section part.
Figure 11:
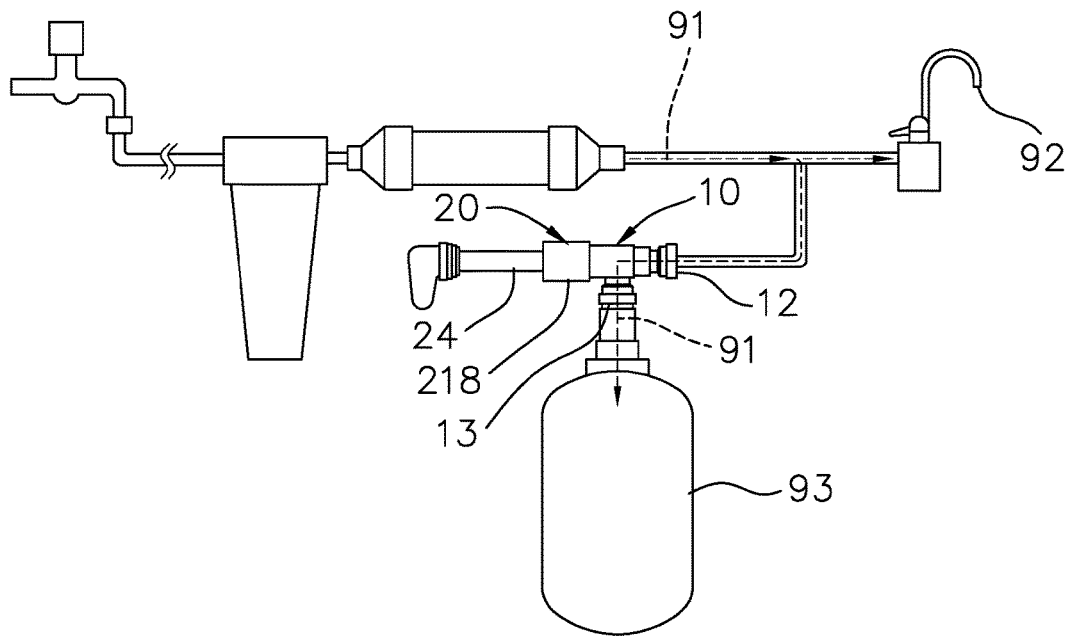
FIG. 11 shows a schematic diagram of a side view of an exemplary application for the valve device in accordance with the present invention.
Figure 12:
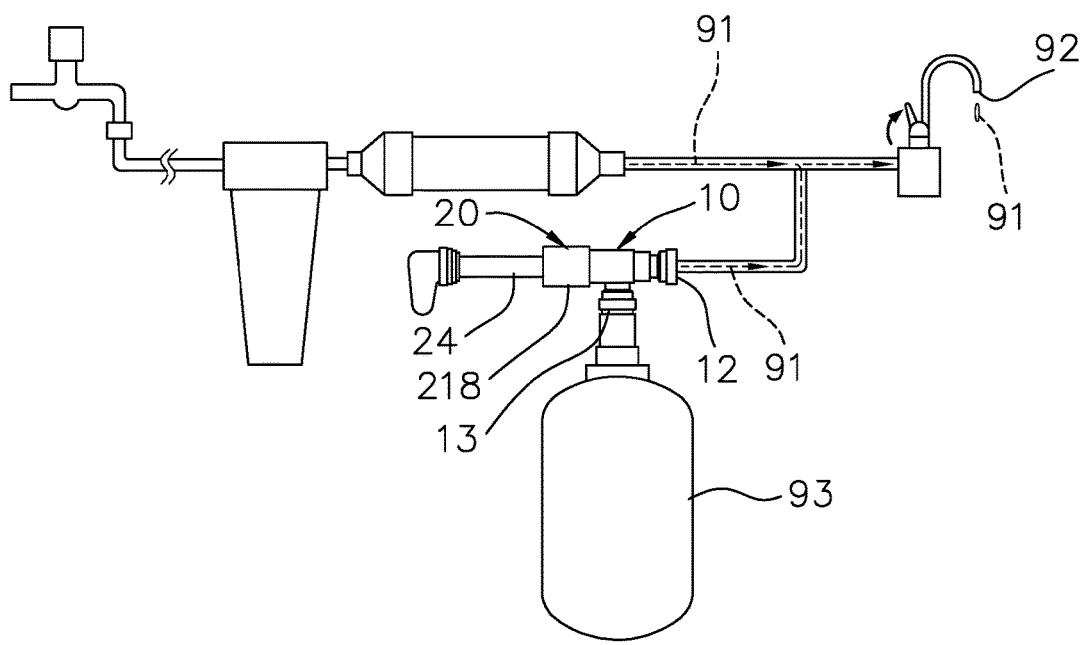
FIG. 12 shows schematic diagram of a side view of the exemplary application in FIG. 11 for the valve device in accordance with the present invention showing water pressure dropping.

The present invention has the following four usage patterns:

(a) Normal water pressure mode: Referring to FIG. 3 (the sealable section part 36 is located in an original position PA), the rotating part 21 is controlled to be located in the water-providing position P1, and the water hole 221 is simultaneously spatially communicable with the second opening 13 and the watercourse 331 (i.e., the inner space 11). Then, water from the water source 91 (Normal working hydraulic pressure of the water is about between 40~60 psi) is supplied to the first opening 12. The water from the water source 91 flows subsequently through the following including the valve claw end part 32 (including the first inner wall surface 121)→the inner space 11→the watercourse 331→the water hole 221→the second opening 13, and is finally supplied to the reservoir pressure vessel 93 (Referring to FIG. 11).

Figure 4:
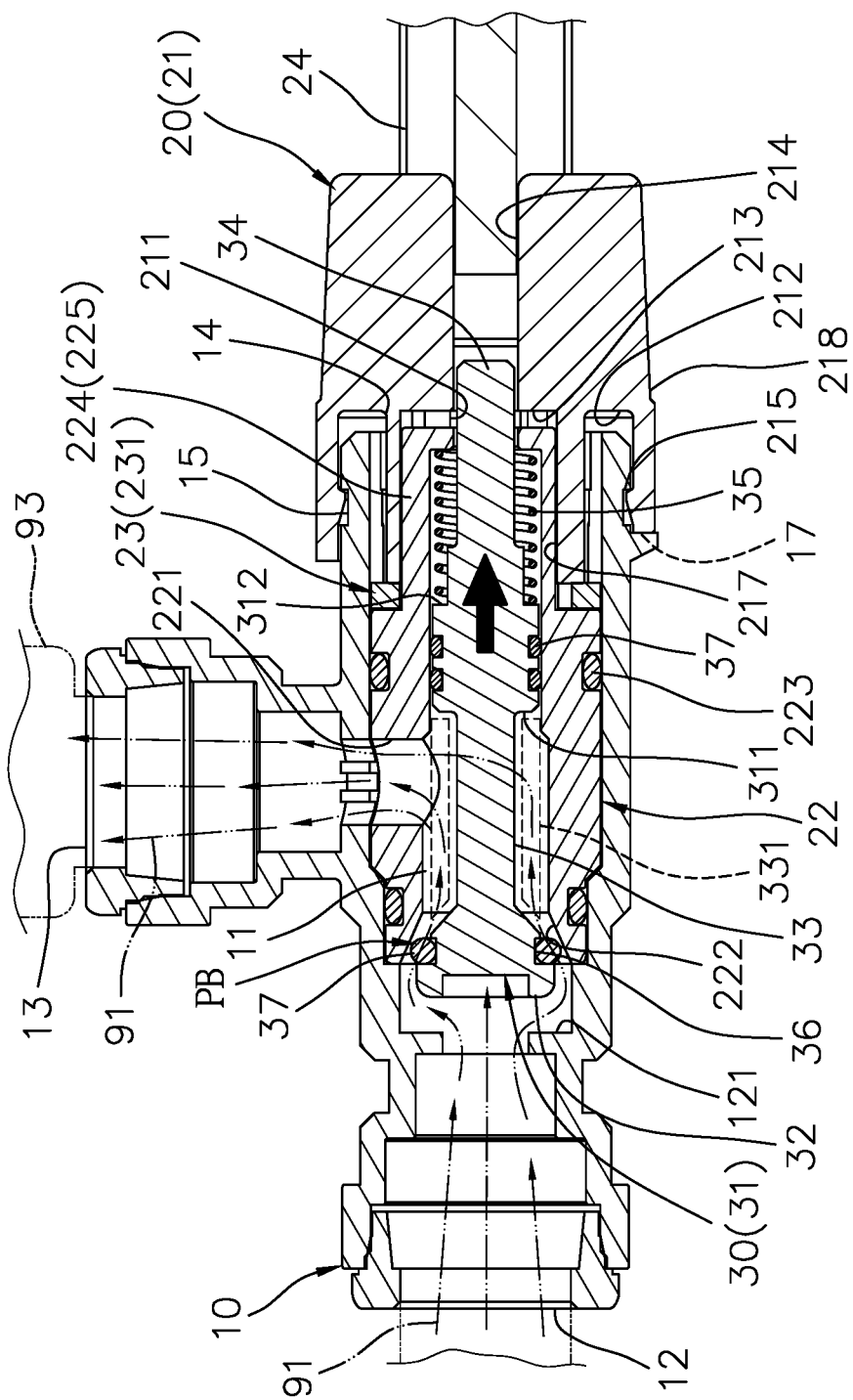
Figure 5:
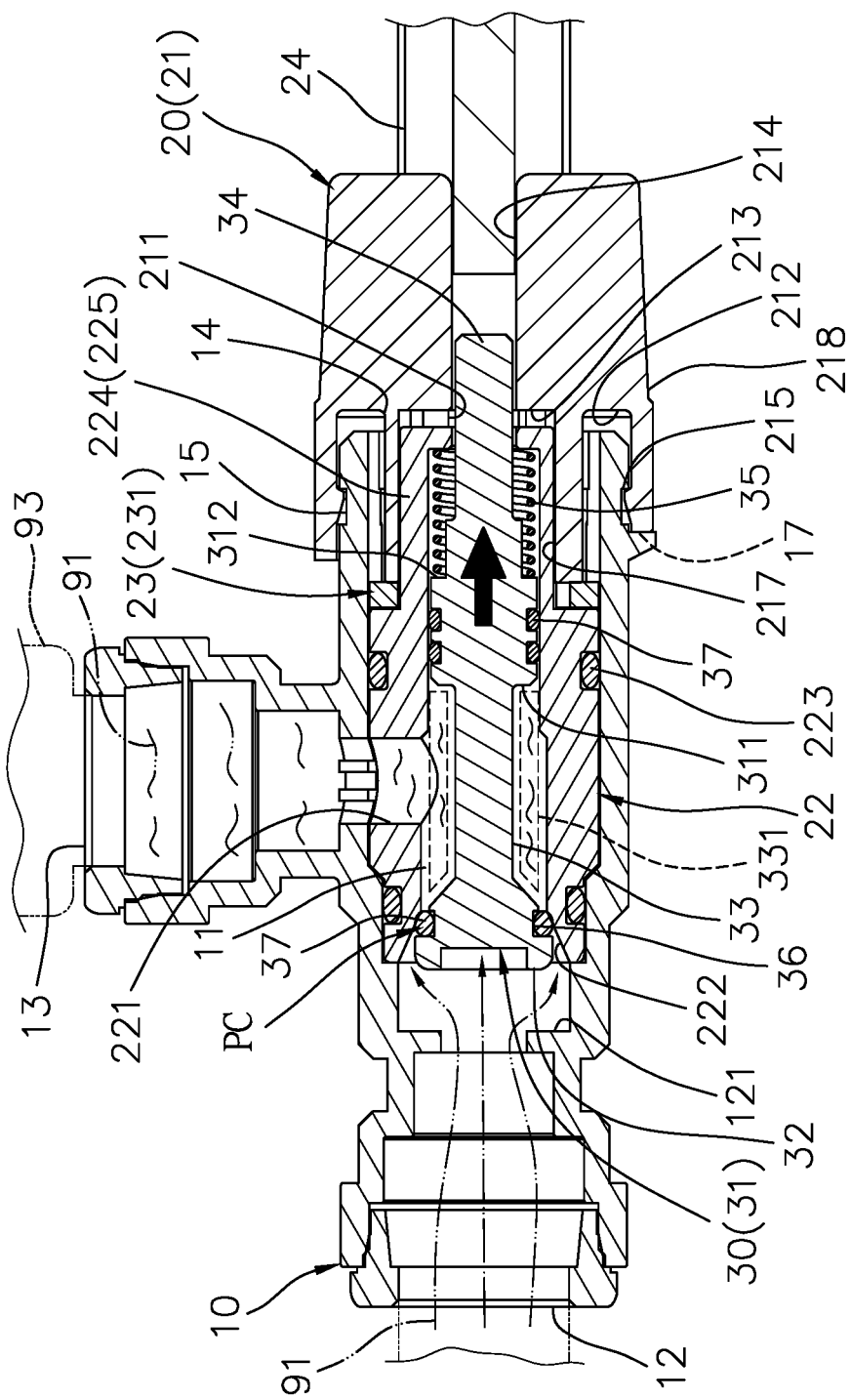
Figure 6:
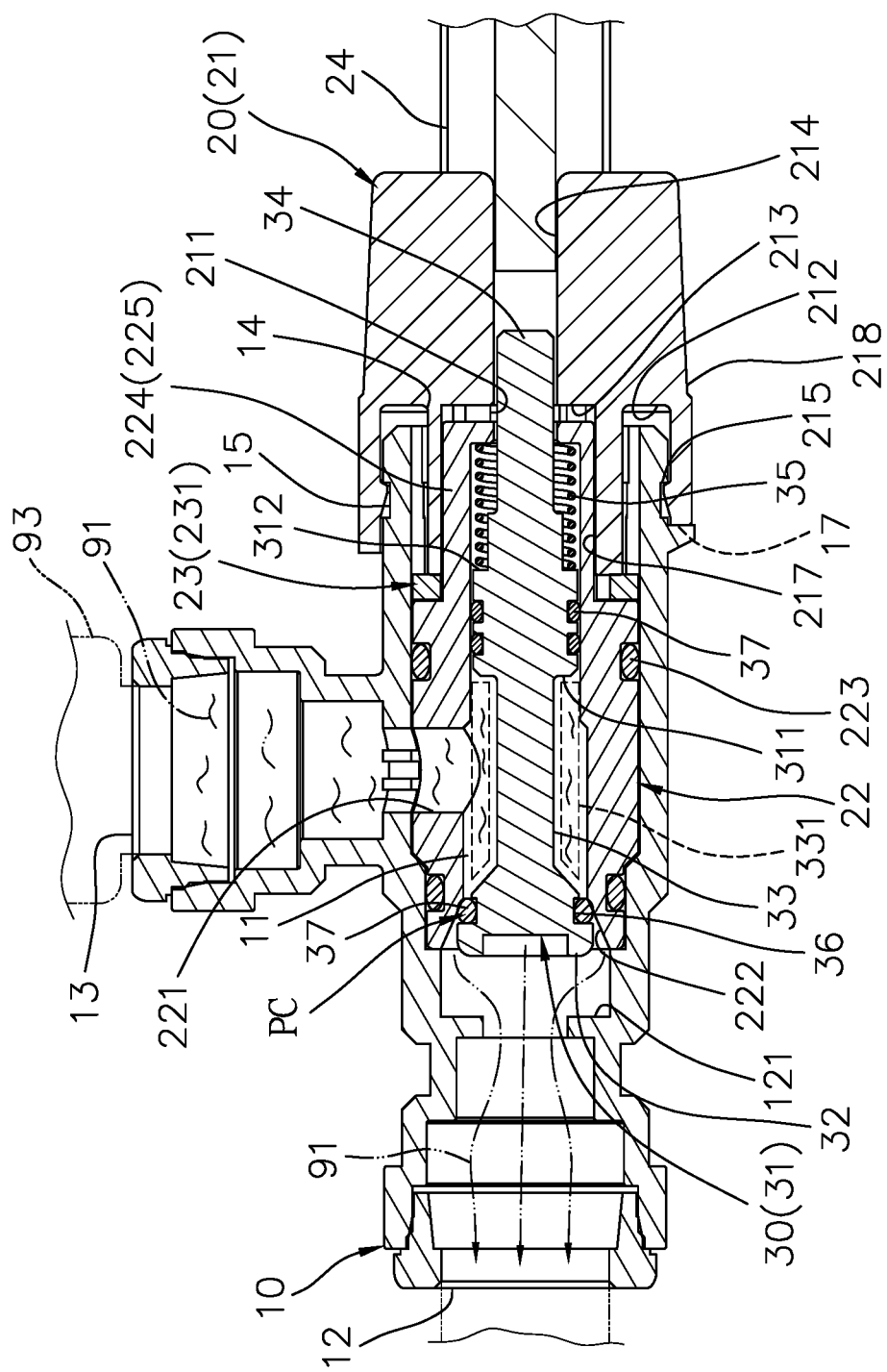
FIGS. 6 to 8 respectively show schematic diagrams of partially sectional views of the valve device in accordance with the present invention showing the sealable section part being located in a watertight position (starting to release pressure), a pressure-releasing position and the original position (supplying water) of the sealable section part.

(b) Water pressure rising above a threshold value mode: When hydraulic pressure of the water source 91 increases (Such as being caused due to well-known breakdown of high-voltage switches of pipelines, or any factors contributed to increase of hydraulic pressure) and is greater than a resilient force of the flexible piece 35, the following actions are produced: water with increased hydraulic pressure starts to push and engage the compression end edge 311 slowly→the valve part 31 starts to press the flexible piece 35 slowly via the stopper end edge 312→the sealable section part 36 moves to the hole wall 222 slowly (As shown in FIG. 4, the watertight section part 36 moves from the original position PA to an in-protecting position PB)→the hydraulic pressure of the water source 91 continues to increase→the water with increased hydraulic pressure continues to push and engage the compression end edge 311→the stopper end edge 312 continues to press the flexible piece 35→the sealable section part 36 contacts with the hole wall 222 watertightly (Meanwhile, as shown in FIG. 5, the sealable section part 36 moves from the in-protecting position PB to a watertight position PC, and at this time, the working pressure of the water source 91 is higher than 60 psi)→the sealable section part 36 blocks communication between the first opening 12 and the second opening 13→water with excessive hydraulic pressure will not flow through the second opening 13 to enter and damage the reservoir pressure vessel 93 (i.e., safe hydraulic pressure is maintained). In other words, even if the pressure of the water source 91 is greater than the threshold value of 60 psi, it does not affect the reservoir pressure vessel 93 because water from the water source 91 has been blocked starting from an outside of the reservoir pressure vessel 93.

Figure 7:
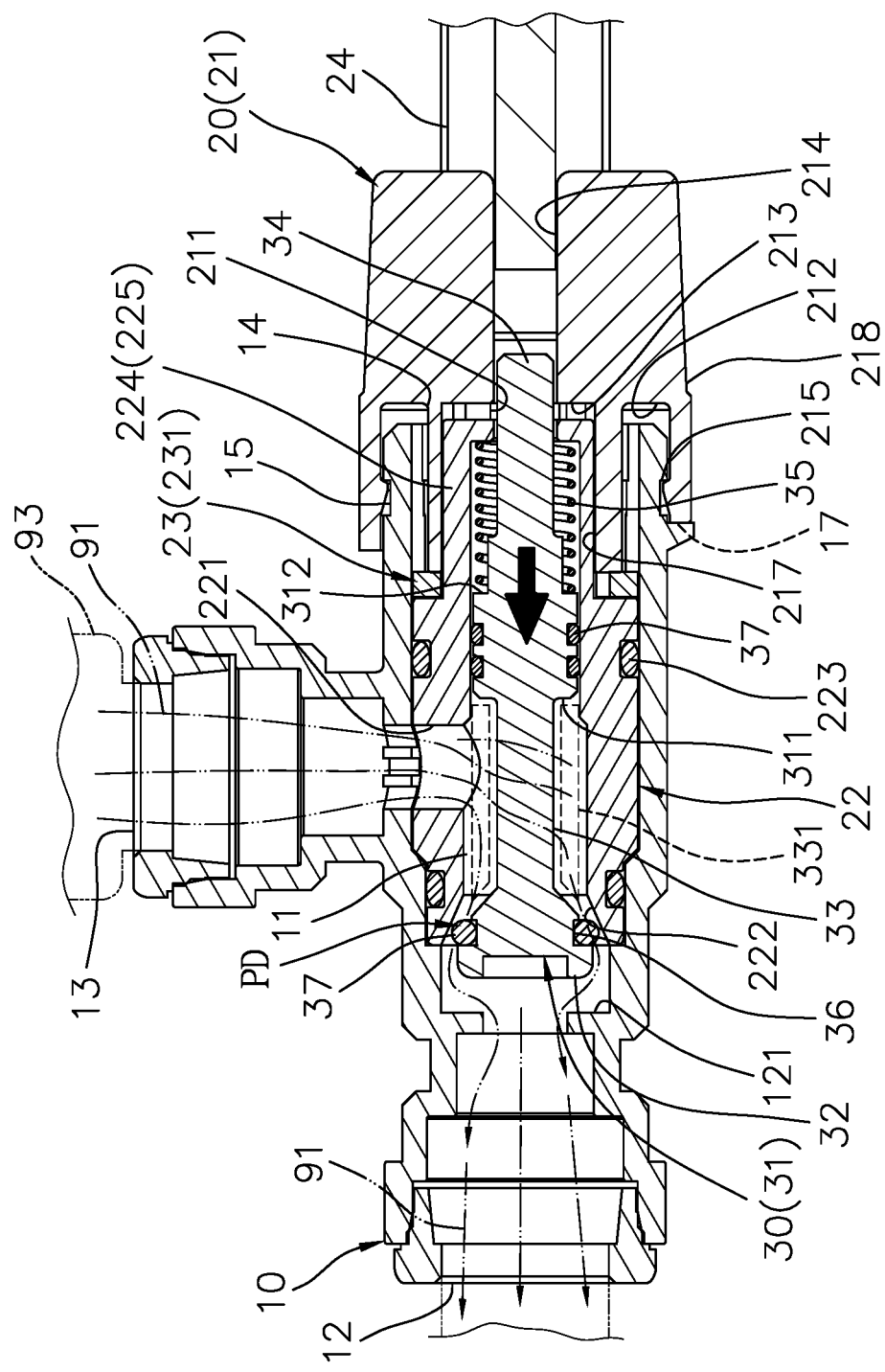
Figure 8:
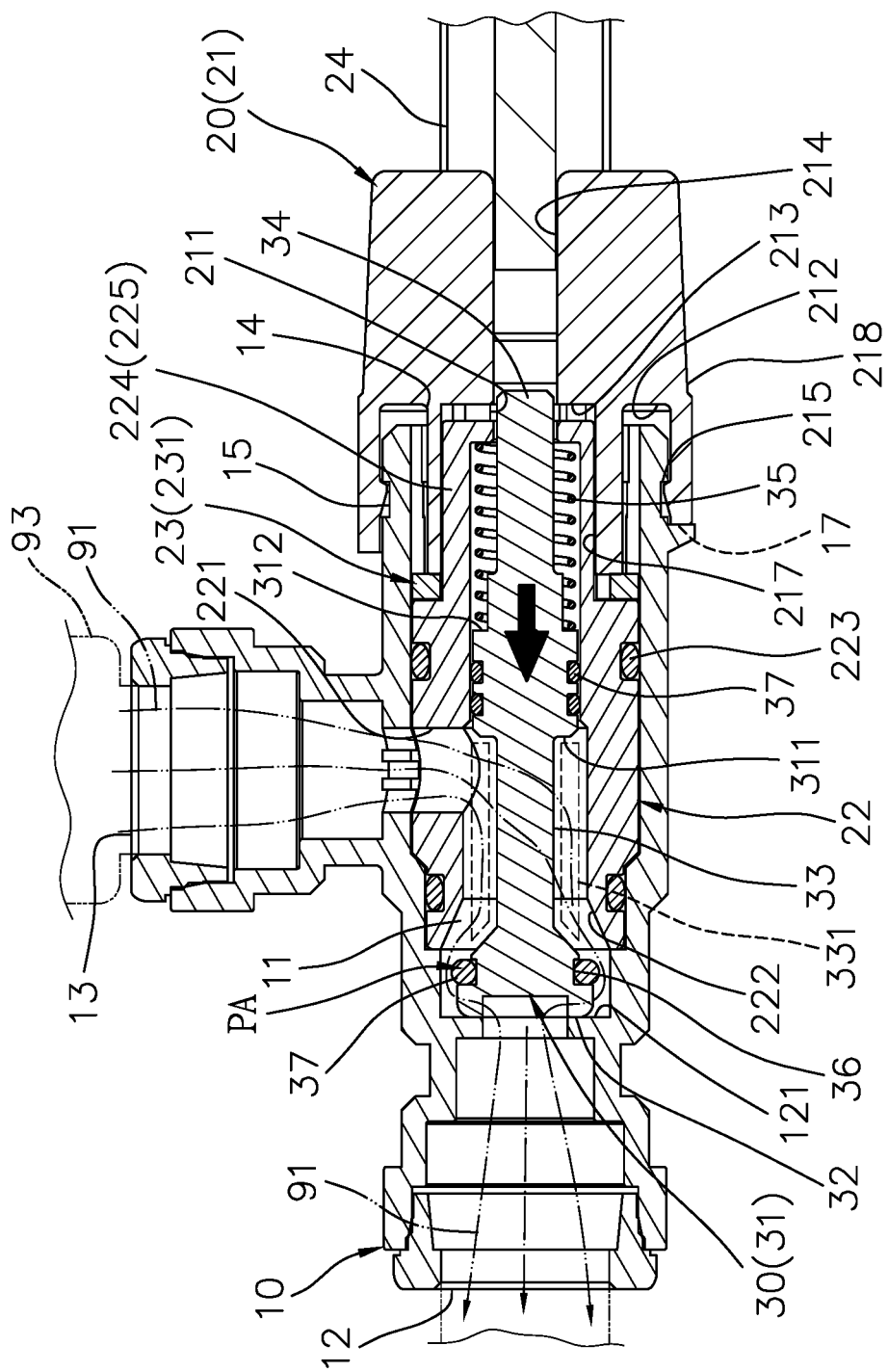

(c) Water pressure dropping below the threshold value mode: Referring to FIGS. 6 to 12, excessive hydraulic pressure of water from the water source 91 starts to drop when the drinking water faucet 92 opens to supply drinking water to people outsides. The flexible piece 35 then slowly pushes the valve part 31 back to its original position (referring to FIG. 8) when the hydraulic pressure is lower than the resilient force of the flexible piece 35 (i.e., when the hydraulic pressure is below the threshold value of 60 psi, as shown in FIG. 7, the flexible piece 35 pushes the valve part 31 from the watertight position PC to a pressure releasing position PD). The first opening 12 and the second opening 13 are restored to be spatially communicable with each other, and to the original normal operation state of the valve device. The above mentioned process is able to protect the reservoir pressure vessel 93 from being damaged by excessive, high hydraulic pressure. The entire operation working flow returns to the depicted state of FIG. 3 due to the hydraulic pressure of the water source 91 has be restored back to the original normal range of 40~60 psi when the drinking water faucet 92 is closed.

(d) Maintenance Mode: As shown in FIGS. 9 to 10, the rotating part 21 is controlled (by using the auxiliary rotating handle 24) to be switched from the water-providing position P1 to the water-stopping position P2. The water hole 221 is staggered away from the second opening 13, and the second opening 13 is closed. Meanwhile, the reservoir pressure vessel 93 can be dismantled from the second opening 13 for its repair (for example, to be replaced). Of course, the threshold value mentioned above may also be adjusted from 60 psi to a higher value subject according to applied situations, such as 70 psi, or a value between 60 psi and 80 psi.

Advantages and effects of the present invention can be summarized as follows:

(a) Piston-typed safety valve set 30 is highly reliable. The safety valve set 30 of the present invention is a "piston-typed" design that is disposed inside and extends through the rotating valve set 20 to axially move relatively therein. Specifically, the safety valve set 30 can physically engage the hole wall 222 to block communication between the first opening 12 and the second opening 13. Reliability of general flexible diaphragm-typed pressure releasing valves or protective valves cannot be compared to the safety valve set 30 of the present invention. Therefore, the piston-typed safety valve set 30 is highly reliable.

(b) Coaxial structure of the valve device can reduce the volume thereof. The safety valve set 30, the rotating valve set 20 and the first opening 12 of the body 10 in accordance with the present invention are set to be coaxial with one another along the longitudinal axis L of the body 10, and the safety valve set 30 is a piston-typed design by being disposed inside and extends through the safety valve set 20. As a result, the volume of the valve device is reduced by coaxially relative movement of the safety valve set 30.

(c) Engagement and hook structure of the valve device can contribute to precise assembly of the valve device. The present invention is designed to be assembled by an engagement and hook structure, and does not use any screws or screwing thread structures in order to reduce the number of components. In comparison to traditional pressure-reducing valves, such design is much more precise. Therefore, the engagement and hook structure of the valve device can contribute to precise assembly of the valve device.

(d) Valve opening and closing function is equipped. In addition to be used for accumulating the safety valve set 30 to constitute the piston-typed design, the rotating valve set 20 of the present invention can rotate relative to the body 10 between the water-stopping position and the water-providing position. Therefore, it has the opening and closing function for its valve body.

(e) The valve device has a wide range of applications. The valve device of the present invention can be directly attached to the pressure vessel, and it can also be arranged and disposed to operate independently in pipelines. Its operating arrangement changes entirely depending on actual needs. Furthermore, in the water-stopping position of the valve device, the pressure vessel can be directly dismantled from pipelines for maintenance. Therefore, it has a wide range of applications.

The present invention is only described in detail by preferred embodiments of the present invention as above. Any simple modifications and changes made to the embodiments are still covered within the inventive spirit of the present invention and the scope as defined in the following claims.

What is claimed is:
1. A valve device capable of maintaining safe pressure of a pressure vessel, comprising:
   a body comprising:
      an inner space;

a first opening spatially communicable with the inner space and having a first inner wall surface and a longitudinal axis defined to extend through a center of the first opening;
a second opening spatially communicable with the inner space;
a rotating valve set disposed at the body corresponding to the first opening, the rotating valve set comprising:
a rotating part being disposed and inserted in the body, and being coaxial with the first opening along the longitudinal axis, the rotating part extending into the inner space and rotating along the longitudinal axis in the inner space relative to the body between a water-providing position and a water-stopping position;
a pivot connecting part located at the rotating part and being coaxial with the first opening along the longitudinal axis;
a water hole disposed at a radial position of the rotating valve set and extending radially through the rotating valve set corresponding to the second opening, and the water hole and the second opening being spatially communicable with each other when the rotating part rotates to the water-providing position, the water hole and the second opening being mutually staggered away from each other when the rotating part rotates to the water-stopping position;
a hole wall located between the first opening and the second opening in the body, and being coaxial with the first opening along the longitudinal axis;
a safety valve set being disposed in the rotating part to extend through the rotating part and extend into the inner space, the safety valve set comprising:
a valve part being disposed inside the rotating part and being able to move along the longitudinal axis relative to the rotating part, the valve part comprising a compression end edge and a stopper end edge, the compression end edge facing toward the hole wall, and the stopper end edge oppositely facing toward the pivot connecting part;
a valve claw end part extending out from the compression end edge along a direction toward the first inner wall surface for the valve part to abut against the first inner wall surface, and being able to maintain spatial communication between the first opening and the inner space;
a connecting rod part disposed between the compression end edge and the valve claw end part, and forming a watercourse between the compression end edge and the valve claw end part, the watercourse being located inside the inner space and is spatially communicable with the first opening and the second opening;
a pivoting end part extending out from the stopper end edge along a direction from the stopper end edge toward the pivot connecting part, and being used for the valve part to be inserted and disposed in the pivot connecting part and to be able to move relative to the pivot connecting part;
a flexible piece being sleeved and disposed on the pivoting end part, and engaged between the rotating part and the stopper end edge, the flexible piece being used for engaging and pushing the valve part to make the valve claw end part abutting and engaging on the first inner wall surface; and
a sealable section part disposed adjacent to the valve claw end part corresponding to the hole wall;
wherein the second opening is opened or closed when the rotating part is located at the water-providing position or the water-stopping position, respectively, when the rotating part is located at the water-providing position, water is supplied from the first opening toward the second opening, when the hydraulic pressure is increased, the compression end edge is pushed to press the flexible piece, and when the hydraulic pressure is increased to exceed a preset safe pressure, the sealable section part is engaged with the hole wall to block a passageway between the first opening and the second opening so that a safe pressure can be maintained at the second opening.

2. The valve device capable of maintaining safe pressure of a pressure vessel as claimed in claim 1, wherein the first opening and the second opening are oriented perpendicular to each other.

3. The valve device capable of maintaining safe pressure of a pressure vessel as claimed in claim 1, wherein the body further comprises a valve opening, a rotating groove and at least one limiting recess part, the rotating groove is ring-shaped, and is recessed and disposed outside the body adjacent to the valve opening, the at least one limiting recess part penetrates through the rotating groove.

4. The valve device capable of maintaining safe pressure of a pressure vessel as claimed in claim 3, wherein:
said rotating part further comprises:
an outer circular groove coaxial with the first opening along the longitudinal axis;
an inner circular groove disposed to be coaxial with the outer circular groove, the pivot connecting part being penetrated through the rotating part and being disposed at an axial position of the inner circular groove;
a connecting piece extending away from the rotating part opposite to an opening direction of the outer circular groove;
a bulge circular wall located at an inner groove surface of the outer circular groove corresponding to the rotating groove, the bulge circular wall being used for the rotating part to engage into the rotating groove and to be able to rotate relative to the body;
an auxiliary rotating projecting piece extending outwardly from a side wall of the outer circular groove;
a plurality of circular groove ribs extending along the longitudinal axis in the inner circular groove, and being disposed at a side wall of the inner circular groove with a predetermined interval along a circumferential direction of the inner circular groove; and
a rotating contact surface located at an outer surface of the side wall of the outer circular groove, and being used for engaging in order to rotate the rotating valve set;
said rotating valve part further comprises:
at least one sealable ring body being sleeved and disposed at the rotating valve part;
a passive piece disposed at the rotating valve part corresponding to the inner circular groove and being used for the rotating valve part to be disposed and assembled in the inner circular groove; and
a plurality of passive ribs being disposed and distributed along a circumferential direction of the passive piece corresponding to the plurality of circular groove ribs for engagement and assembly of the rotating valve part onto the plurality of circular groove ribs;

wherein the rotating valve set further comprising:
a limiting part having a ring body and at least one limiting claw, the ring body being used for the limiting part to be sleeved and disposed outside the plurality of passive ribs, the at least one limiting claw being used for the limiting part to engage with the limiting recess part by being inserted from the inner space toward the limiting recess part in order to stop the rotating valve part from dropping out of the valve opening along the longitudinal axis; and
an auxiliary rotating handle connected to the connector piece and used for auxiliary rotating the rotating part.

5. The valve device capable of maintaining safe pressure of a pressure vessel as claimed in claim 4, wherein the safety valve set further comprises at least one sealing ring body sleeved and disposed at the valve part for the valve part.

6. The valve device capable of maintaining safe pressure of a pressure vessel as claimed in claim 5, wherein the first opening is in a parallel connection with a water source and a drinking water faucet so that water can flow into or out of the device, the second opening is spatially communicated with a reservoir pressure vessel, the water source supplies the water to the reservoir pressure vessel after reverse osmosis is applied on the water when the water flows into the device, the reservoir pressure vessel supplies the water to the drinking water faucet for using when the water flows out.

* * * * *